(12) United States Patent
Hare et al.

(10) Patent No.: US 11,893,585 B2
(45) Date of Patent: Feb. 6, 2024

(54) ASSOCIATING MULTIPLE USER ACCOUNTS WITH A CONTENT OUTPUT DEVICE

(71) Applicant: Apple Inc., Cupertino, CA (US)

(72) Inventors: Peter J. Hare, San Francisco, CA (US); Vijay Sundaram, San Ramon, CA (US); Sudhakar N. Mambakkam, San Jose, CA (US); Venkatesh Venishetty, Santa Clara, CA (US); Vamsi K. Kondadasula, Milpitas, CA (US); Quenton D. Jones, Layton, UT (US)

(73) Assignee: Apple Inc., Cupertino, CA (US)

( * ) Notice: Subject to any disclaimer, the term of this patent is extended or adjusted under 35 U.S.C. 154(b) by 321 days.

(21) Appl. No.: 16/712,895

(22) Filed: Dec. 12, 2019

(65) Prior Publication Data

US 2020/0380510 A1 Dec. 3, 2020

Related U.S. Application Data

(60) Provisional application No. 62/855,272, filed on May 31, 2019.

(51) Int. Cl.
*G06Q 20/40* (2012.01)
*H04W 4/80* (2018.01)
(Continued)

(52) U.S. Cl.
CPC ............. *G06Q 20/40* (2013.01); *G06Q 20/10* (2013.01); *G06Q 20/385* (2013.01);
(Continued)

(58) Field of Classification Search
CPC ...... G06Q 20/40; G06Q 20/10; G06Q 20/385; G06Q 20/123; G06Q 20/4014;
(Continued)

(56) References Cited

U.S. PATENT DOCUMENTS 9,112,849 B1 * 8/2015 Werkelin Ahlin ........................... H04N 21/25816
9,323,916 B1 * 4/2016 Wu ........................ H04L 63/126
(Continued)

FOREIGN PATENT DOCUMENTS

| CN | 106415630 A | 2/2017 |
| CN | 106664451 A | 5/2017 |
| WO | WO 2018/052841 | 3/2018 |

OTHER PUBLICATIONS

International Scarch Report and Written Opinion from PCT/US2020/028358, dated Jul. 2, 2020, 14 pages.
(Continued)

*Primary Examiner* — Harunur Rashid
(74) *Attorney, Agent, or Firm* — BAKERHOSTETLER

(57) ABSTRACT

A device implementing a system to associate a user account with a content output device includes at least one processor configured to receive an invitation to access content associated with a first user account on another device associated with a second user account, the other device being connected to a local area network. The at least one processor is further configured to send, to a server, a request for authorization to access the content associated with the first user account on the other device associated with the second user account, the request comprising information included with the invitation, and to receive, from the server, the authorization to access the content. The at least one processor is further configured to access, based at least in part on the authorization, the content associated with the first user account on the other device associated with the second user account.

20 Claims, 8 Drawing Sheets

(51) Int. Cl.
*G06Q 20/10* (2012.01)
*G06Q 20/38* (2012.01)
*H04L 9/32* (2006.01)
*H04W 12/06* (2021.01)

(52) U.S. Cl.
CPC ............. *H04L 9/3228* (2013.01); *H04W 4/80* (2018.02); *H04W 12/06* (2013.01)

(58) Field of Classification Search
CPC ... H04L 9/3228; H04L 9/0891; H04L 9/0894; H04L 9/3213; H04L 67/306; H04L 63/104; H04L 63/0815; H04W 4/80; H04W 12/06; H04W 12/33; H04W 12/084; H04W 12/08
See application file for complete search history.

(56) References Cited

U.S. PATENT DOCUMENTS

| | | | | |
|---|---|---|---|---|
| 2004/0083215 | A1* | 4/2004 | de Jong | H04L 63/123 |
| 2011/0265157 | A1* | 10/2011 | Ryder | H04L 67/1097 |
| | | | | 726/4 |
| 2012/0331529 | A1* | 12/2012 | Ibel | H04L 9/32 |
| | | | | 726/4 |
| 2013/0225080 | A1* | 8/2013 | Doss | H04L 67/51 |
| | | | | 455/41.2 |
| 2013/0309971 | A1* | 11/2013 | Kiukkonen | H04L 63/107 |
| | | | | 455/41.2 |
| 2015/0058936 | A1* | 2/2015 | Kang | H04W 12/068 |
| | | | | 726/4 |
| 2015/0188762 | A1* | 7/2015 | Hong | H04L 12/2809 |
| | | | | 709/208 |
| 2018/0083961 | A1* | 3/2018 | Lewis | G06F 21/44 |
| 2018/0351937 | A1* | 12/2018 | Ahlin | H04N 21/6334 |

OTHER PUBLICATIONS

European Office Action from European Patent Application No. 20723749.6, dated Sep. 22, 2022, 6 pages.
European Office Action from European Patent Application No. 20723749.6, dated Feb. 14, 2023, 8 pages.
Chinese Office Action from Chinese Patent Application No. 202080040245.0, dated Apr. 18, 2023, 13 pages including English language translation.
European Office Action from European Patent Application No. 20723749.6, dated Aug. 22, 2023, 8 pages.
Indian Office Action from Indian Patent Application No. 202117053965, dated Aug. 23, 2023, 7 pages.

* cited by examiner

ASSOCIATING MULTIPLE USER ACCOUNTS WITH A CONTENT OUTPUT DEVICE

CROSS REFERENCE TO RELATED APPLICATIONS

This application claims the benefit of priority to U.S. Provisional Patent Application No. 62/855,272, entitled "Associating Multiple User Accounts with a Content Output Device," and filed on May 31, 2019, the disclosure of which is hereby incorporated herein in its entirety.

TECHNICAL FIELD

The present description relates generally to associating user accounts with content streaming devices, including associating multiple user accounts with a content streaming device.

BACKGROUND

A user may have multiple devices for accessing content from the user's online content library. For example, the devices may be configured to output content from the user's library, such as music and/or video.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

As noted above, a user may have multiple content output devices for accessing their content library (e.g., music and/or video). In some cases, the user may use his/her personal device (e.g., a mobile device such as a smartphone or smartwatch) in order to remotely control the output of content on a content output device (e.g., a content output device such a digital media player or a smart speaker in the user's household). For example, the mobile device and the content output device may be connected to a local area network within the user's household, and/or may be connected via a peer-to-peer connection. However, the user may also wish to invite another user (e.g., a household member such as a roommate and/or a family member) to access the content output device. The subject system provides for authorizing the other user (or users) to access content, e.g. from their own content library, on the content output device.

In particular, the other user may receive (e.g., at their mobile device) an invitation (e.g., sent from the host user's mobile device) to access the content output device. The invitation may include user account identifiers (IDs) for the host user and/or the other user, and an identifier (ID) for the content output device. In response to receiving the invite, the invited user's mobile device may send a request (e.g., which includes the user account IDs and the output device ID) to a server, for authorization to access the content output device. The server may send, to the invited user's mobile device, the authorization to access the content output device. For example, the authorization may be implemented as a token which indicates the user account IDs and the output device ID. The invited user's mobile device may use the authorization (e.g., token) to access content (e.g., music and/or video from their own content library) via the content output device, for example, while both the invited user's mobile device and the content output device are connected to the local area network and/or are connected via a peer-to-peer connection.

Figure 1:
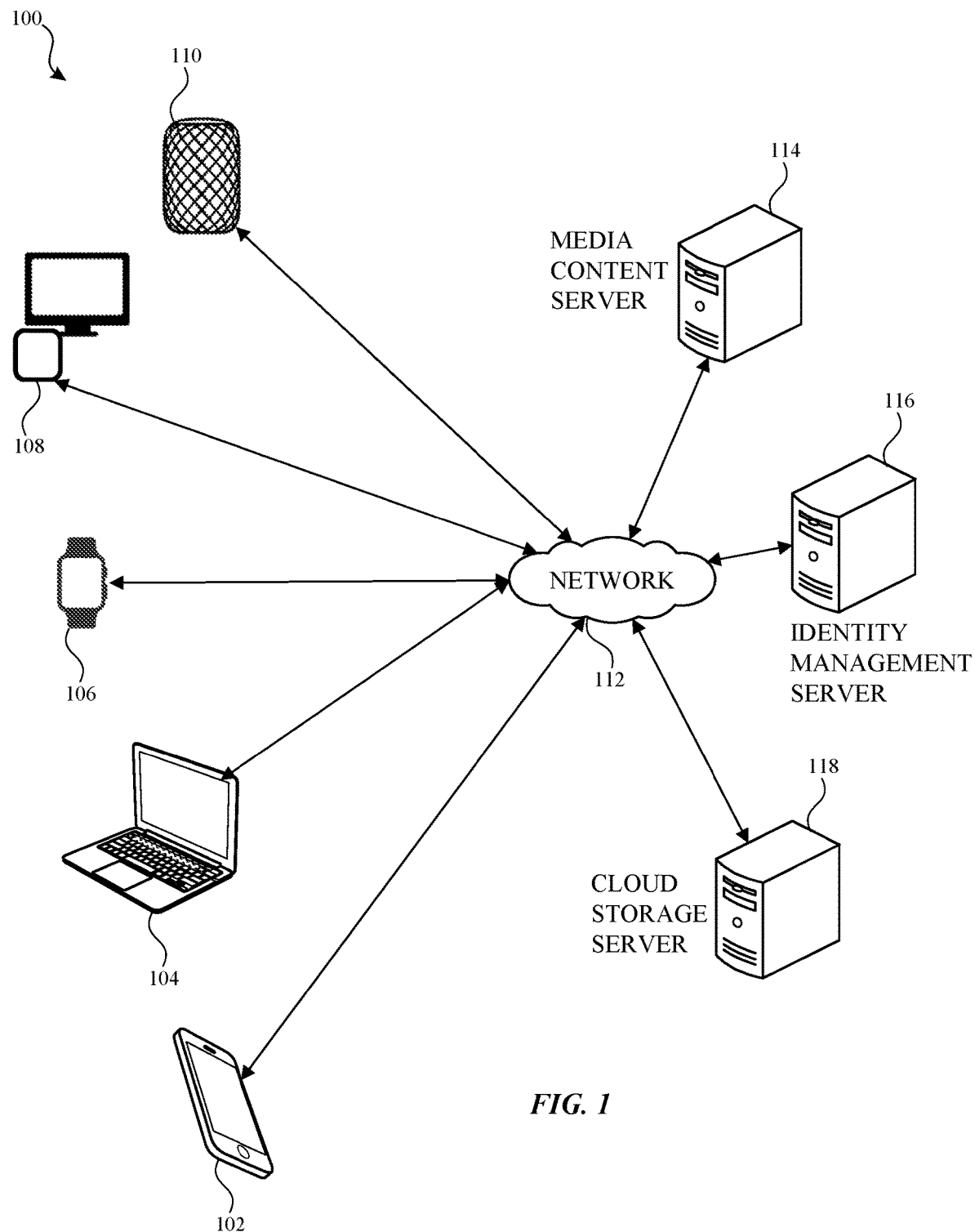
FIG. 1 illustrates an example network environment for authorizing a user account to access content on a device in accordance with one or more implementations.

FIG. 1 illustrates an example network environment for authorizing a user account to access content on a device in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 104, 106, 108 and 110 (hereinafter "the electronic devices 102-110"), a media content server 114, an identity management server 116 and a cloud storage server 118 (hereinafter "the servers 114-118"), and a network 112. The network 112 may communicatively (directly or indirectly) couple, for example, any two or more of the electronic devices 102-110 and the servers 114-118. In one or more implementations, the network 112 may be an interconnected network of devices that may include, and/or may be communicatively coupled to, the Internet. In one or more implementations, the network 112 may correspond to a local area network (e.g., a WiFi network) connecting one or more of the electronic devices 102-110. For explanatory purposes, the network environment 100 is illustrated in FIG. 1 as including electronic devices 102-110 and servers 114-118; however, the network environment 100 may include any number of electronic devices and any number of servers.

One or more of the electronic devices 102-110 may be, for example, a portable computing device such as a laptop computer, a smartphone, a smart speaker, a digital media player, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartphone, the electronic device 104 is depicted as a laptop computer, the electronic device 106 is depicted as a smartwatch, and the electronic device 110 is depicted as a smart speaker. By way of example, the electronic device 108 is depicted as a digital media player (e.g., configured to receive digital data such as music and/or video and stream it to a television or other video display). In one or more implementations, the electronic device 108 may be integrated into the display device.

One or more of the electronic devices 102-110 may be configured to communicate or otherwise interact with one or more of the servers 114-118. Each of the electronic devices 102-110 may be, and/or may include all or part of, the device discussed below with respect to FIG. 2, and/or the electronic system discussed below with respect to FIG. 8.

In one or more implementations, the media content server 114 may be configured to provide media content (e.g., via streaming and/or download) for outputting on a device (e.g., one or more of the electronic devices 102-110). The identity management server 116 may be configured to verify and/or manage identifiers (IDs) associated with user accounts and/or devices. The cloud storage server 118 may be configured to store data (e.g., files such as documents and/or photos) associated with user accounts for download on user devices, to share and/or send data to other users, and/or to back-up (e.g., wirelessly) device data. Moreover, in one or more implementations, users may have user accounts that are managed by the identity management server 116, and the user accounts may be associated with content libraries (e.g., music and/or video content) provided by the media content server 114.

One or more of the servers 114-118 may be, and/or may include all or part of the electronic system discussed below with respect to FIG. 8. Each of the servers 114-118 may include one or more servers, such as a cloud of servers. For explanatory purposes, a single server is shown and discussed with respect to various operations for each of the servers 114-118. However, these and other operations discussed herein may be performed by one or more servers, and each different operation may be performed by the same or different servers.

Figure 2:
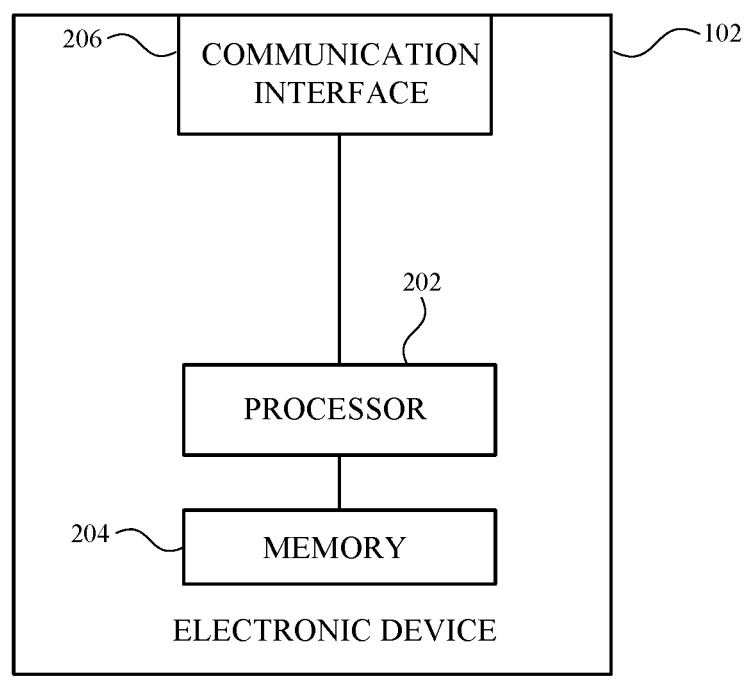
FIG. 2 illustrates an example device that may implement a system for authorizing a user account to access content on a device in accordance with one or more implementations.

FIG. 2 illustrates an example device that may implement a system for authorizing a user account to access content on a device in accordance with one or more implementations. For explanatory purposes, FIG. 2 is primarily described herein with reference to the electronic device 102 of FIG. 1. However, FIG. 2 may correspond to any of the electronic devices 102-110 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a processor 202, a memory 204, and a communication interface 206. The processor 202 may include suitable logic, circuitry, and/or code that enable processing data and/or controlling operations of the electronic device 102. In this regard, the processor 202 may be enabled to provide control signals to various other components of the electronic device 102. The processor 202 may also control transfers of data between various portions of the electronic device 102. Additionally, the processor 202 may enable implementation of an operating system or otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store one or more applications for remotely controlling the playback of content on another device (e.g., the electronic devices 108 and/or 110). Examples of such applications, include but are not limited to, a control application, a virtual assistant application and/or a remote control application.

The communication interface 206 may include suitable logic, circuitry, and/or code that enables wired or wireless communication, such as between any of the electronic devices 102-110 and one of more of the servers 114-118 over the network 112. The communication interface 206 may include, for example, one or more of a Bluetooth communication interface, a cellular interface, an NFC interface, a Zigbee communication interface, a WLAN communication interface, a USB communication interface, or generally any communication interface.

In one or more implementations, one or more of the processor 202, the memory 204, the communication interface 206, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
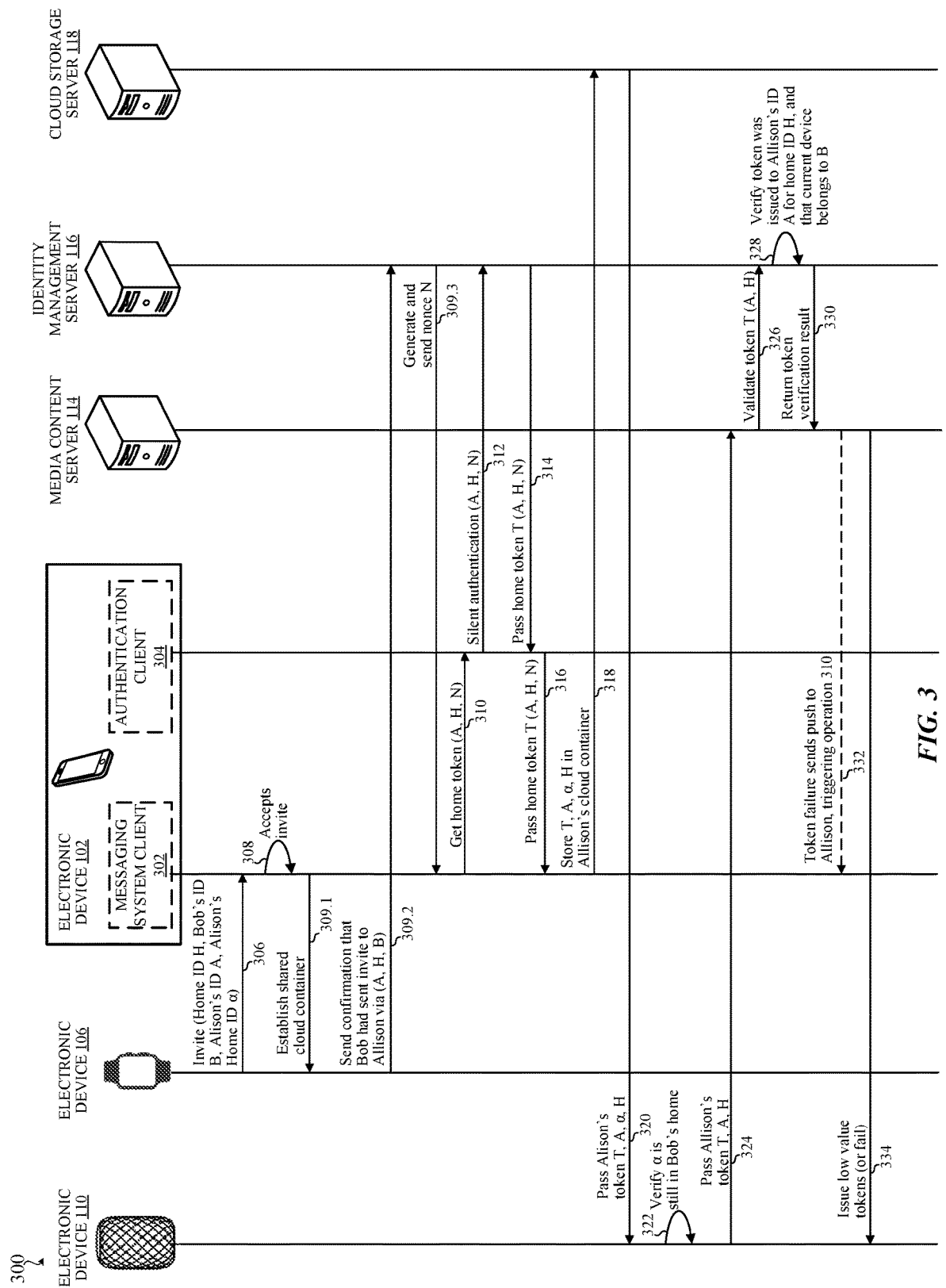
FIG. 3 illustrates an example process for authorizing a user account to access content on a device in accordance with one or more implementations.

FIG. 3 illustrates an example process 300 for authorizing a user account to access content on a device in accordance with one or more implementations. For explanatory purposes, the process 300 is primarily described herein with reference to the electronic devices 102, 106 and 110, and the servers 114-118 of FIG. 1. However, the process 300 is not limited to the electronic devices 102, 106 and 110, and the servers 114-118 of FIG. 1, and one or more blocks (or operations) of the process 300 may be performed by one or more other components and/or other suitable devices (e.g., any of the electronic devices 102-110). Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

In the example of FIG. 3, the electronic device 102 may correspond to a device associated with a user account of a first user (e.g., named "Alison"). Alison may reside in or be a guest of a home/residence (hereinafter "home") that is also the home of a second user (e.g., named "Bob"). The electronic devices 106 and 110 may correspond to devices associated with Bob's user account, and may be connected to a local area network of the home. In one or more implementations, Bob may interact with the electronic device 106 (e.g., via a remote control application, control application or virtual assistant application running on the electronic device 106) in order to access and/or output content (e.g., music from Bob's online content library) on the electronic device 110.

However, Bob may also wish to invite Alison to access the electronic device 110 while connected to the local area network. The process 300 illustrates an example of Bob sending an invitation to Alison, so that Alison may interact with her electronic device 102 (e.g., via a remote control application, control application or virtual assistant application running on the electronic device 102) in order to access, and/or output content (e.g., music from Alison's online content library) on, the electronic device 110. After accepting the invitation, Alison may use her electronic device 102 as a remote control in order to output content (e.g., content that is streamed via the media content server 114 in association with her user account) on the electronic device 110.

In one or more implementations, each of the remote control application, the control application and the virtual assistant application may be implemented as part an operating system running on the electronic device 102 (or the electronic device 106) or may be a third party application. Each of these applications may be configured to receive user input, in order to output content on the electronic device 110.

For example, the remote control application may allow for remote control of another device (e.g., the electronic device 108 or 110), for example, that is connected on the same local area network (e.g., WiFi) as the electronic device 102. The control application may provide direct access to predefined settings for the electronic device 102, including remote control of another device. The control application may be activated, for example, via a predefined user gesture (e.g., swiping up from the bottom of the display of the electronic device 102). The virtual assistant application may use voice queries and a natural-language user interface to perform actions (e.g., remote control actions) by delegating requests to a set of services (e.g., Internet services and/or services within a local area network).

Alternatively or in addition, Alison may access her media content (e.g., music and/or video) on the electronic device 110 (e.g., and/or the electronic device 108) without use of her electronic device 102. For example, the electronic device 110 (e.g., smart speaker) may have a virtual assistant application running thereon, and Alison may provide a voice command to stream music via the media content server 114 in association with her user account. In another example, the electronic device 108 (e.g., digital media player) may have a separate remote control device that Alison can use to stream video and/or music via the media content server 114 in association with her user account.

The electronic device 106 may provide a user interface (e.g., as part of an application for inviting/authorizing user account(s) to access content on Bob's devices) which allows Bob to invite Alison to access the electronic device 110. In response to user input via the user interface to send the invitation, the electronic device 106 sends the invitation to Alison's electronic device 102 (306). In one or more implementations, the invitation may include multiple identifiers, including: a home ID 'H' for identifying the home, Bob's ID 'B' for identifying a user account of Bob, Alison's ID 'A' for identifying a user account of Alison, and Alison's ID 'α' for identifying Alison within the home. In one or more implementations, Alison's ID α is an optional identifier. In other words, ID α may be replaced with ID A with respect to identifying Alison within the home.

As seen in FIG. 3, the electronic device 102 may include a messaging system client 302 and an authentication client 304. For example, the messaging system client 302 may be configured to send/receive messages with other electronic devices (e.g., the electronic devices 106, 110) and/or servers (e.g., the cloud storage server 118). The authentication client 304 may be configured to communicate with the identity management server 116, in order to authenticate the user account of Alison (e.g., via Alison's ID A), and/or other accounts using appropriate IDs.

After receiving the invitation, the electronic device 102 may provide a user interface for Alison to accept the invite. For example, the user interface may be part of a notification provided by an operating system running (e.g., or an application associated with authorizing user account(s) to access another user's home devices) on the electronic device 102.

As noted above, Bob's user account may be associated with multiple electronic devices (e.g., the electronic devices 108 and 110) that he may invite Alison to use, e.g., for output of content. In such a case, the user interface for Alison to accept the invite may include a user-selectable list of the electronic device(s) for outputting content, and Alison may individually select which of those devices she would like use for accessing content (e.g., associated with Alison's user account). After making such selection (if applicable), Alison may accept the invite via the user interface (308).

In response to Alison accepting the invite, the electronic device 102 may create a shared record (e.g., or cloud container, discussed below with respect to operation 318). To establish the shared record, the messaging system client 302 may send a message to the electronic device 106 (309.1). The electronic device 106 may receive this message, for example, via a respective messaging client system (not shown) on the electronic device 106. The messaging client system of the electronic device 106 may inform a respective authentication client (not shown) on the electronic device 106. The authentication client of the electronic device 106 may send a confirmation message (e.g., including Alison's ID A, home ID H and Bob's ID B) to the identity management server 116 (309.2). The confirmation message may confirm to the identity management server 116 that Bob had sent the invite to Alison.

In one or more implementations, the identity management server 116 may save this state (e.g., confirmation), and require it to have happened in order to issue a token at operation 314 discussed below. The authentication client of the electronic device 106 may inform the messaging client system of the electronic device 106 of completion, and the messaging client of the electronic device 106 may accept the shared record. Moreover, in one or more implementations, the identity management server 116 may generate a nonce N, corresponding to a unique identifier that is known (e.g., and saved) by the identity management server 116. The identity management server may provide the nonce N to the messaging system client 302 (309.3).

The messaging system client 302 may send a request to the authentication client 304 for a home token T (310). For example, the home token T may provide Alison with the authorization to access the electronic device 110, such as to output content from Alison's content library managed by the media content server 114. In the example of FIG. 3, the request for the home token T may include Alison's ID A, home ID H and the nonce N.

The authentication client 304 sends a request (e.g., including IDs A, H and N) to the identity management server 116, for verification (312). In one or more implementations, the request to authenticate the user may be a silent authentication which does not require Alison to manually provide user credentials. In one or more implementations, Alison's electronic device 102 may request that Alison authenticate in order to obtain the home token.

The identity management server 116 may verify the IDs A and H, by verifying that A is an ID that identifies the user account of Alison, and H is an ID that identifies the home (e.g., of Bob), and may further verify the nonce N. After such verification, the identity management server 116 may generate a home token T based on the IDs A, H and the nonce N, and send the home token back to the authentication client 304 of the electronic device 102 (314). In one or more implementations, based at least partly on the nonce N, the home token T indicates that Bob has authorized Alison (e.g., identified by ID A) to use the device(s) (e.g., the electronic device 110, or other devices such as the electronic device 108) in Bob's home (e.g., identified by H), such as for outputting content. The authentication client 304 may pass the home token T to the messaging system client (316).

The messaging system client 302 may then send a request to the cloud storage server 118, where the request is to store a cloud container (e.g., corresponding to the shared record established at operation 309.1) which includes the home token T and the IDs A, α and H on the cloud storage server 118 (318). As noted above, the cloud storage server 118 may be configured to store data (e.g., files such as documents and/or photos) in association with user accounts for download on user devices, to share and/or send data to other users, and to back-up (e.g., wirelessly) device data.

The cloud storage server 118 may pass the record (e.g., including the home token T and the IDs A, α and H) to the electronic device 110 (320). The electronic device 110 may verify that Alison's ID α is still associated with the home ID H associated with Bob's account (322). If verified, the electronic device 110 sends the home token T and the IDs A and H to the media content server 114 (324). As noted above, the media content server 114 may be configured to provide (e.g., stream or provide as a download) media content associated with the user account of Alison. In the example of FIG. 3, the user account ID A may apply to both the media content server 114 (e.g., associated with Alison's media library, such as for music and/or video) and the cloud storage server 118 (e.g., associated with Alison's files, such as documents and/or photos). However, as discussed below with respect to FIG. 4, the user account IDs for the media content server 114 and the cloud storage server 118 may be different, if Alison has a split account.

The media content server 114 sends a request to validate the home token T to the identity management server 116 (326). The identity management server 116 verifies that the home token T was issued to Alison's user account ID A for the home ID H, and further verifies that the electronic device 110 still belongs to Bob (328). The identity management server 116 returns a verification result to the media content server 114 (330).

In a case where the verification result indicates that the home token T is not valid, the media content server 114 sends a message (e.g., a push notification) to the messaging system client 302, for example, indicating a token failure (332). Upon receipt of this message, the messaging system client 302 may be configured to resume back to operation 310 (e.g., to request a valid token). In addition, the media content server 114 sends an indication of the token failure to the electronic device 110 (334).

In a case where the verification result indicates that the home token T is valid, the media content server 114 generates and sends a token (e.g., a low-value token) to the electronic device 110 (334). The low-value token may be used for outputting content associated with Alison's user account from the media content server 114 to the electronic device 110. In other words, Alison may be able to interact with her electronic device 102 (e.g., via a remote control application, a control application and/or a virtual assistant application) in order to select media content for output on the electronic device 110.

As noted above, the media content may be selected based on content that is available/associated with the user account of Alison (e.g., individual songs, playlists and/or videos within a media library of Alison). Alternatively or in addition, Alison may be able to select content that is available/associated with the user account of Bob (e.g., individual songs, playlists and/or videos within a media library of Bob), since the electronic device 110 is also associated with Bob's user account.

Thus, in one or more implementations, Alison may be able to access media content associated with Bob's user account and/or Bob may be able to access media content associated with Alison's user account, as long as both Bob and Alison's user accounts are authorized to output to the electronic device 110, or to other devices within the home (e.g. the electronic device 108). For example, with respect to the electronic device 108 (e.g., digital media player), Alison may be able to select her account or Bob's account before selecting the content for output. After selection, the electronic device 108 may use the account settings for the respective user account (e.g., Alison's or Bob's) in order to populate the list of available content, user preferences and/or other user settings for display on the electronic device 108.

In one or more implementations, the token may be "low-value" in that the token is limited to the automatic access/output of content that is free and/or previously purchased. For example, Alison may simply select media content (e.g., music and/or video) for output, and the electronic device 110 may automatically output the content, in cases where the content is free and/or previously purchased (e.g., in association with Alison or Bob's user account). However, in cases where the content requires payment (e.g., in order to stream and/or download the content), the media content server 114 may prompt Alison for a password (e.g., associated with Alison's user account, Bob's user account and/or the home account (ID H)), in order for Alison to purchase the content for output (e.g., on the electronic device 110).

In one or more implementations, it is possible for Bob to add a new electronic device (not shown) within his home. In doing so, the new electronic device may be associated with the home ID H, and Bob's user account ID B, and a low-value token may be issued to the new electronic device to provide Alison with access to the new electronic device. In one or more implementations, upon the electronic device 102 connecting to the local area network of the home, after the new electronic device has been added to the home, the electronic device 102 may prompt Alison if she would like to add the new electronic device to the list of devices that Alison may access within the home.

Figure 4:
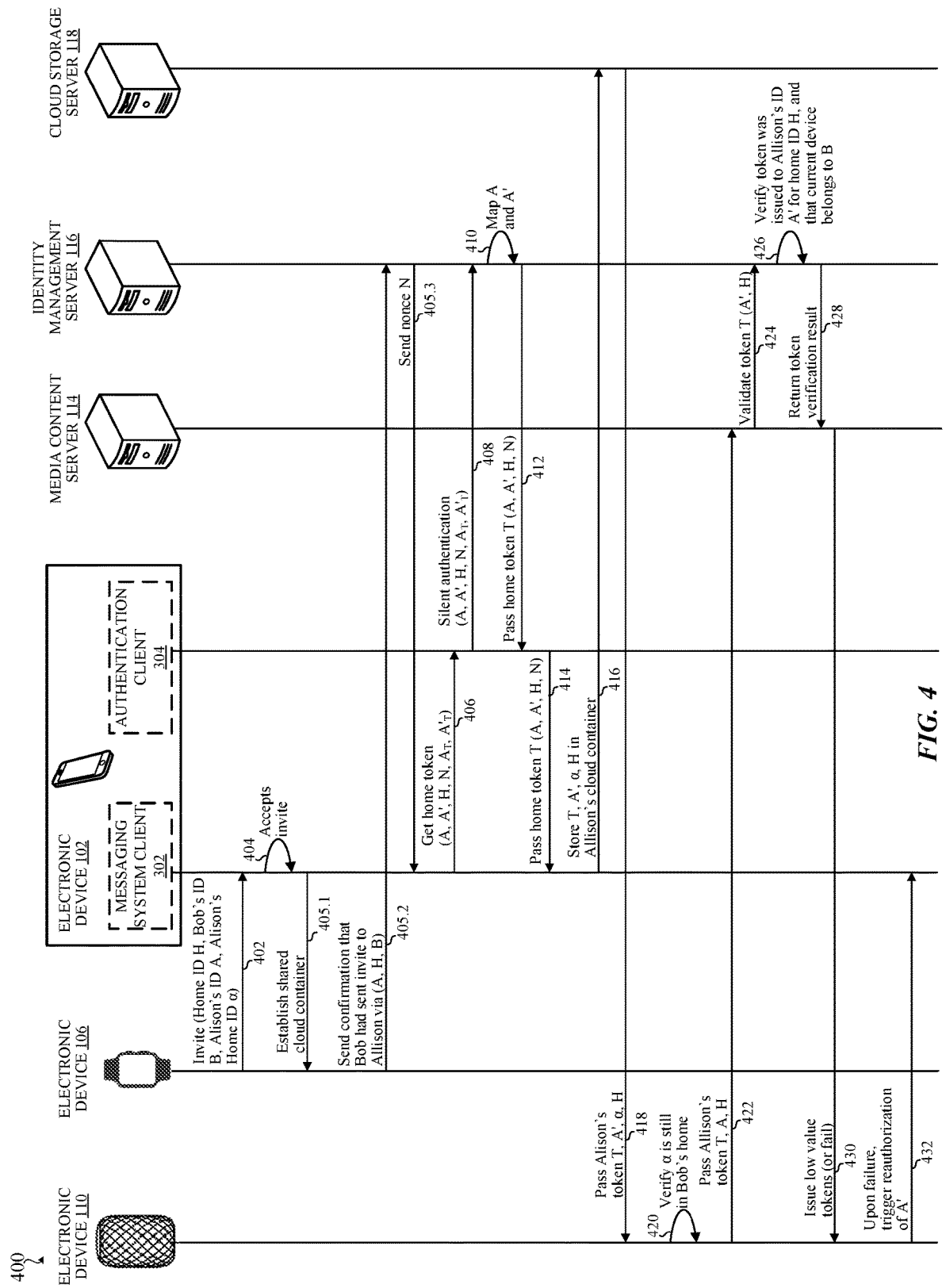
FIG. 4 illustrates another example process for authorizing a user account to access content on a device in accordance with one or more implementations.

FIG. 4 illustrates another example process 400 for authorizing a user account to access content on a device in accordance with one or more implementations. For explanatory purposes, the process 400 is primarily described herein with reference to the electronic devices 102, 106 and 110, and the servers 114-118 of FIG. 1. However, the process 400 is not limited to the electronic devices 102, 106 and 110, and the servers 114-118 of FIG. 1, and one or more blocks (or operations) of the process 400 may be performed by one or more other components and/or other suitable devices (e.g., any of the electronic devices 102-110). Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

As noted above, with respect to user account IDs, a user may select to use the same user ID for the media content server 114 (e.g., associated with Alison's media library, such as for music and/or video) and the cloud storage server 118 (e.g., associated with Alison's files, such as documents and/or photos). Alternatively, the user may select to have, and/or may otherwise have, different user account IDs (e.g., a split user account) for the media content server 114 and the cloud storage server 118.

In the above-described example of FIG. 3, the user account ID A for Alison applied to both of the media content server 114 and the cloud storage server 118. However, in FIG. 4, Alison has a split user account. Thus, in the example of FIG. 4, the user account ID A applies for the cloud storage server 118, and a new user account ID A' applies to the media content server 114. Relative to the process 300 of FIG. 3, the process 400 of FIG. 4 further adds a mapping operation 410 which maps the user account ID A to the user account ID A'. Moreover, operations 430 and 432 in FIG. 4 differ relative to operations 332 and 334 of FIG. 3.

At operation 402, the electronic device 106 sends an invitation (e.g., based on Bob's user input via a user interface) to Alison's electronic device 102. The invitation may include multiple identifiers, including the home ID H, and IDs B, A and α (e.g., where α is optional as noted above).

Alison may provide user input at a user interface provided by the electronic device 102, for example, which individually selects the device(s) (e.g., the electronic device 108 and/or the electronic device 110) she would like to use for accessing content in Bob's home. After making such selection (if applicable), Alison may accept the invite via the user interface (404).

In response to Alison accepting the invite, the electronic device 102 may create a shared record (e.g., corresponding to the cloud container of operation 416 below). To establish the shared record, the messaging system client 302 may send a message to the electronic device 106 (405.1). The electronic device 106 may receive this message, for example, via a respective messaging client system (not shown) on the electronic device 106. The messaging client system of the electronic device 106 may inform a respective authentication client (not shown) on the electronic device 106. The authentication client of the electronic device 106 may send a confirmation message (e.g., including Alison's ID A, home ID H and Bob's ID B) to the identity management server 116 (405.2). The confirmation message may confirm to the identity management server 116 that Bob had sent the invite to Alison.

In one or more implementations, the identity management server 116 may save this state (e.g., confirmation), and require it to have happened in order to issue a token at operation 412 discussed below. The authentication client of the electronic device 106 may inform the messaging client system of the electronic device 106 of completion, and the messaging client of the electronic device 106 may accept the shared record. Moreover, in one or more implementations, the identity management server 116 may generate a nonce N, corresponding to a unique identifier that is known (e.g., and saved) by the identity management server 116. The identity management server may provide the nonce N to the messaging system client 302 (405.3).

The messaging system client 302 sends a request to the authentication client 304 for a home token (406), where the home token T provides Alison with the authorization to access content using the electronic device 110. Similar to the process 300, the request for the home token T may include Alison's user account ID A, the home ID H and nonce N. However, the request for the home token T may further include Alison's ID A', which corresponds to the user account for Alison with respect to the media content server 114. In addition, the request for the home token T may include tokens $A_T$ and $A'_T$. For example the tokens $A_T$ and $A'_T$ may provide for the identity management server 116 to determine that A and A' are authenticated for the electronic device 102.

Thus, the authentication client 304 sends a request (e.g., including IDs A, A', H, N, $A_T$ and $A'_T$) to the identity management server 116, in order to authenticate (e.g., silently authenticate) the electronic device 102 (408). The identity management server 116 may verify the IDs A, H and the nonce N, similar to the process 300 of FIG. 3. In addition, the identity management server 116 may map the user account ID A of Alison to the user account ID A' of Alison (410). For example, since Alison has a split user account, this mapping by the identity management server 116 may be used to link the user account ID A to the user account ID and A'.

After such verification and mapping, the identity management server 116 may generate a home token T based on the IDs A, A', H and N, and send the home token T back to the authentication client 304 of the electronic device 102 (412). The home token T may indicate, at least partly based on the nonce N, that Bob's user account has authorized Alison's user account (e.g., identified by ID A') to use the device(s) (e.g., the electronic device 110, or other devices such as the electronic device 108) in Bob's home (e.g., identified by H), such as for outputting content. The authentication client 304 may pass the home token T to the messaging system client (414).

The messaging system client 302 may then send a request to the cloud storage server 118, where the request is to store a cloud container (e.g., corresponding to the shared record established at operation 405.1) which includes the home token T, and the IDs A', α and H on the cloud storage server 118 (416).

The cloud storage server 118 may pass the record (e.g., including the home token T and the IDs A', α and H) to the electronic device 110 (418). The electronic device 110 may verify that Alison's ID α is still linked to the home ID H of Bob (420). If verified, the electronic device 110 sends the home token T and IDs A and H to the media content server 114 (422), which may be configured to provide (e.g., stream or provide as a download) media content associated with the user account A' of Alison.

The media content server 114 sends a request to validate the home token T to the identity management server 116 (424). The request to validate the home token T may include identifiers A' and H. The identity management server 116 verifies that the home token T was issued to Alison's user account ID A' for the home ID H (e.g., based on the mapping from operation 410), and further verifies that the electronic device 110 still belongs to Bob (426). The identity management server 116 returns a verification result to the media content server 114 (428).

In a case where the verification result indicates that the home token T is not valid, the media content server 114 sends an indication of the token failure to the electronic device 110 (430). The electronic device 110 then sends a message to the messaging system client 302, for example, indicating a token failure (432). Upon receipt of this message, the messaging system client 302 may be configured to resume back to operation 406 (e.g., for the reauthorization of ID A').

In a case where the verification result indicates that the home token T is valid, the media content server 114 generates and sends a token (e.g., a low-value token) to the electronic device 110 (430). The low-value token may be used for outputting content associated with Alison's user account (e.g., ID A') and/or Bob's user account (e.g., ID B) from the media content server 114 to the electronic device 110. The low-value token may provide for automatic output of content in cases where the content is free and/or previously purchased. Alternatively or in addition, in cases where the content requires payment, the media content server 114 may prompt Alison for a password (e.g., associated with Alison's user account, Bob's user account and/or the home account (ID H)).

In one or more implementations, the user may select to have, and/or may otherwise have, different multiple user account IDs with respect to the media content server 114. For example, the user may have multiple electronic devices (e.g., one or more devices in addition to the electronic device 102), and each of the electronic devices may be associated with a respective user account ID for the media content server 114. Thus, in one or more implementations, the subject system may provide that the user account ID associated with the device used to accept the invite (e.g., the electronic device 102 at operation 404) initially be selected as the user account ID with respect to accessing content on the electronic device 110. In a case where a user subsequently uses a different device (e.g., which is associated with/logged into another user account ID) to access content on the electronic device 110, the different device may provide a user interface which prompts the user whether to update the user account ID for accessing content on the electronic device 110 with the other user account ID. If the choses to update via the user interface, the user account ID is updated accordingly. Otherwise, the user account ID is not updated. The user account ID may be updated in a similar manner with respect to other devices (e.g., with different user account IDs) that subsequently access content via the electronic device 110.

Figure 5:
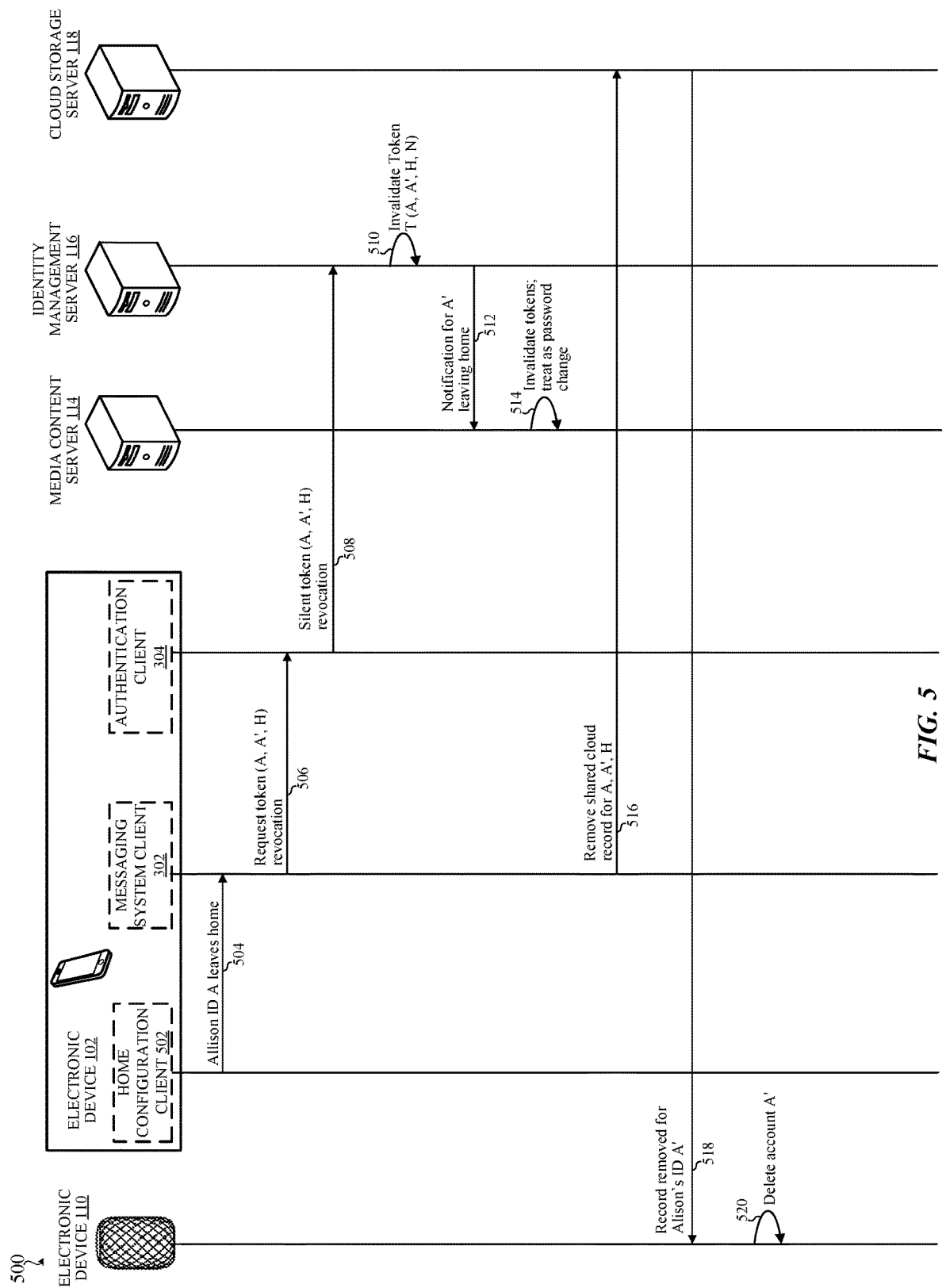
FIG. 5 illustrates an example process for revoking authorization of a user account to access content on a device in accordance with one or more implementations.

FIG. 5 illustrates an example process for revoking authorization of a user account to access content on a device in accordance with one or more implementations. For explanatory purposes, the process 500 is primarily described herein with reference to the electronic devices 102 and 110, and the servers 114-118 of FIG. 1. However, the process 500 is not limited to the electronic devices 102 and 110, and the servers 114-118 of FIG. 1, and one or more blocks (or operations) of the process 500 may be performed by one or more other components and/or other suitable devices (e.g., any of the electronic devices 102-110). Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

In some cases, Alison may decide to no longer use the device(s) (e.g., the electronic devices 108 and/or 110) in Bob's home for output of media content associated with the user account of Alison and/or Bob. For example, may Alison have been a resident of Bob's home and used the electronic device 110 for output of media content while she resided at Bob's home. However, when moving to another home, Alison may no longer desire to have the content from her user account accessible via the device(s) in Bob's home. Thus, Alison may choose to revoke her home token T.

The electronic device 102 may have a home configuration client 502 which can be used to configure, communicate with, and control home device(s) (e.g., the electronic devices 108 and 110). The home configuration client 502 may provide a user interface for Alison to revoke her access to those device(s). For example, the user interface may provide an option for Alison to indicate that she would like to leave Bob's home account H (e.g., and therefore requesting to revoke her access to the device(s)). Alison may select this option, and the home configuration client 502 may send a corresponding indication to the messaging system client 302 (504).

The messaging system client 302 may send a revocation request to the authentication client 304, where the revocation request indicates to revoke the token T with respect to IDs A, A' (e.g., provided Alison has a split account) and H (506). The authentication client 304 may in turn send a request for revocation (e.g., a silent revocation in which Alison is not required to manually provide user credentials) to the identity management server 116 for the token T with respect to the IDs A, A' and H (508).

The identity management server 116 may invalidate the token T with respect to the IDs A, A', H and the nonce N (510). For example, the identity management server 116 may indicate the invalidation by flagging IDs A and/or A' invalid with respect to the home ID H and the nonce N, or by otherwise updating credentials for the home token T to no longer associate IDs A and/or A' with the home ID H and the nonce N.

The identity management server 116 sends an indication of the revocation to the media content server 114 (512). The indication may include the ID A' (e.g., and/or the ID A, if Alison does not have a split account), such that the media content server 114 would no longer automatically output content to the electronic device 110, e.g. based on Alison's using the electronic device 102 as a remote control to access the electronic device 110. The media content server 114 invalidates the low-value tokens provided to the electronic device 110 associated with Bob's home H, for example, by treating the invalidation as a password change (514). As such, Alison would be required to manually input credentials (e.g., a username and password) in order to access her content on the electronic device 110.

In addition, the messaging system client 302 of the electronic device 102 sends a request to the cloud storage server 118, to remove the record (e.g., which includes the IDs A, A' and H) stored on the cloud storage server 118 (516). The cloud storage server 118 may send a request to the electronic device 110, for the electronic device 110 to remove the ID A' from memory on the electronic device 110 (518). The electronic device may remove the ID A' from memory (520).

Figure 6:
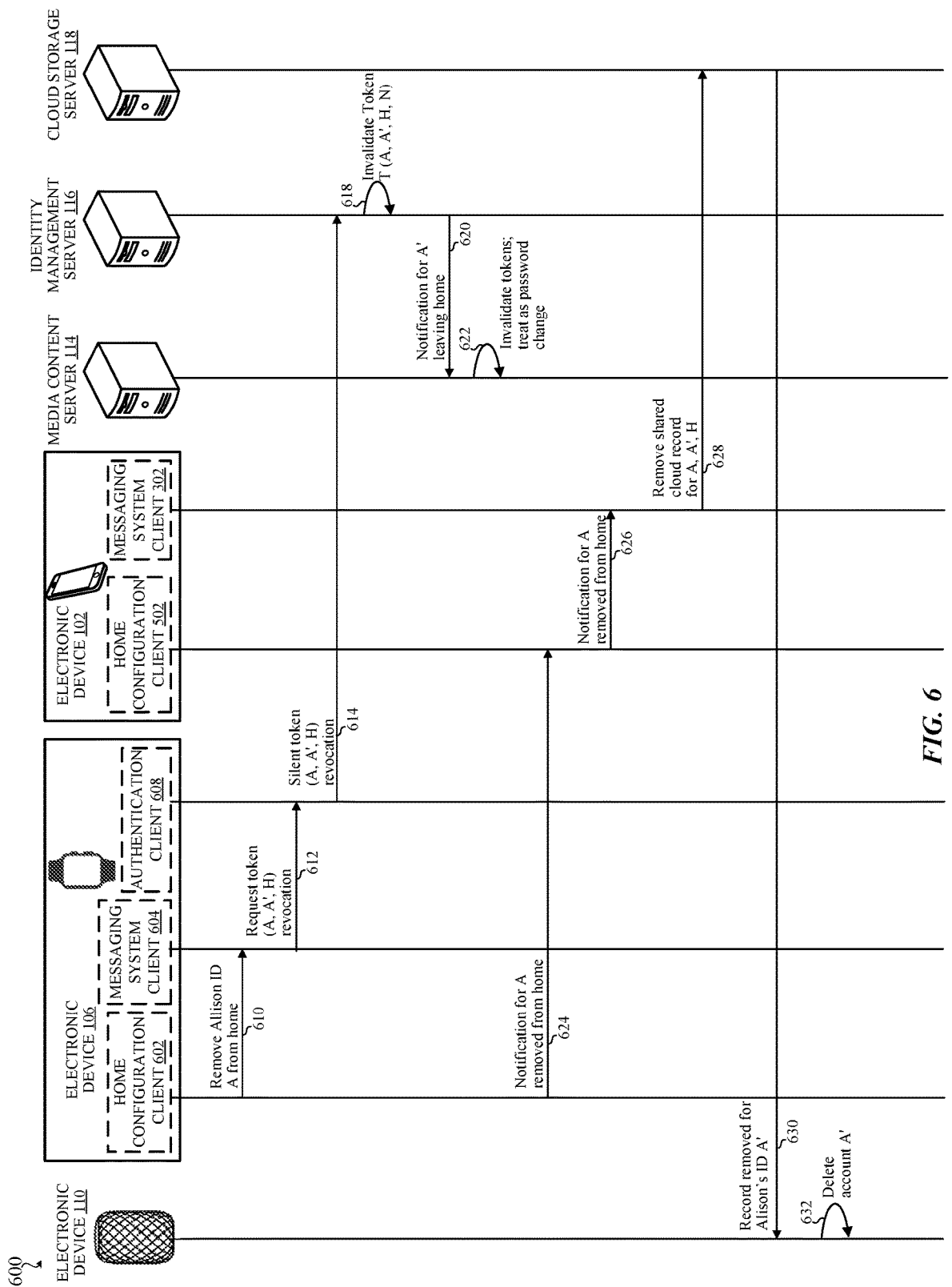
FIG. 6 illustrates another example process for revoking authorization of a user account to access content on a device in accordance with one or more implementations.

FIG. 6 illustrates another example process for revoking authorization of a user account to access content on a device in accordance with one or more implementations. For explanatory purposes, the process 600 is primarily described herein with reference to the electronic devices 102, 106 and 110, and the servers 114-118 of FIG. 1. However, the process 600 is not limited to the electronic devices 102, 106 and 110, and the servers 114-118 of FIG. 1, and one or more blocks (or operations) of the process 600 may be performed by one or more other components and/or other suitable devices (e.g., any of the electronic devices 102-110). Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

In the example of FIG. 6, Bob may decide to revoke Alison's authorization to access Bob's home devices (e.g., if Bob knows that Alison will no longer be residing in Bob's home). For example, once the authorization is revoked, Alison will no longer have automatic authorization to use access the electronic device 110 associated with Bob's home H, e.g., using her electronic device 102 to output content on the electronic device 110.

The electronic device 106 (e.g., of Bob) may have a home configuration client 602, a messaging system client 604 and/or an authentication client 608. The home configuration client 602 may provide a user interface Bob to revoke Alison's token with respect to Bob's home device(s). For example, the user interface may provide an option for Bob remove Alison from Bob's home. Bob may select this option, and the home configuration client 602 may send a corresponding indication to the messaging system client 604 (610).

The messaging system client 604 may send a revocation request to the authentication client 608, where the revocation request indicates to revoke the token T with respect to IDs A, A' (e.g., provided Alison has a split account) and H (612). The authentication client 608 may in turn send a request for revocation (e.g., a silent revocation) to the identity management server 116, where the request indicates the token with respect to IDs A, A' and H (614).

The identity management server 116 may invalidate the token T with respect to the IDs A, A', H and N (618), for example, by flagging or updating credentials as discussed above with respect to FIG. 5. The identity management server 116 sends an indication of the revocation to the media content server 114 (620). The media content server 114 invalidates the low-value token previously provided to the electronic device 110, for example, by treating the invalidation as a password change (622).

The home configuration client 602 of the electronic device 106 (e.g., Bob) sends a notification to the home configuration client 502 of the electronic device 102 (e.g., Alison) that Alison has been removed from the home with respect to accessing Bob's electronic devices associated with the home (624). The home configuration client 502 notifies the messaging system client 302 of the electronic device 102 that Alison has been removed (626).

In response, the messaging system client 302 sends a request to the cloud storage server 118, to remove the record (e.g., which includes the IDs A, A' and H) stored on the cloud storage server 118 (628). The cloud storage server 118 sends a request to the electronic device 110, for the electronic device 110 to remove the ID A' from memory on the electronic device 110 (630). The electronic device removes the ID A' from memory (632).

Figure 7:
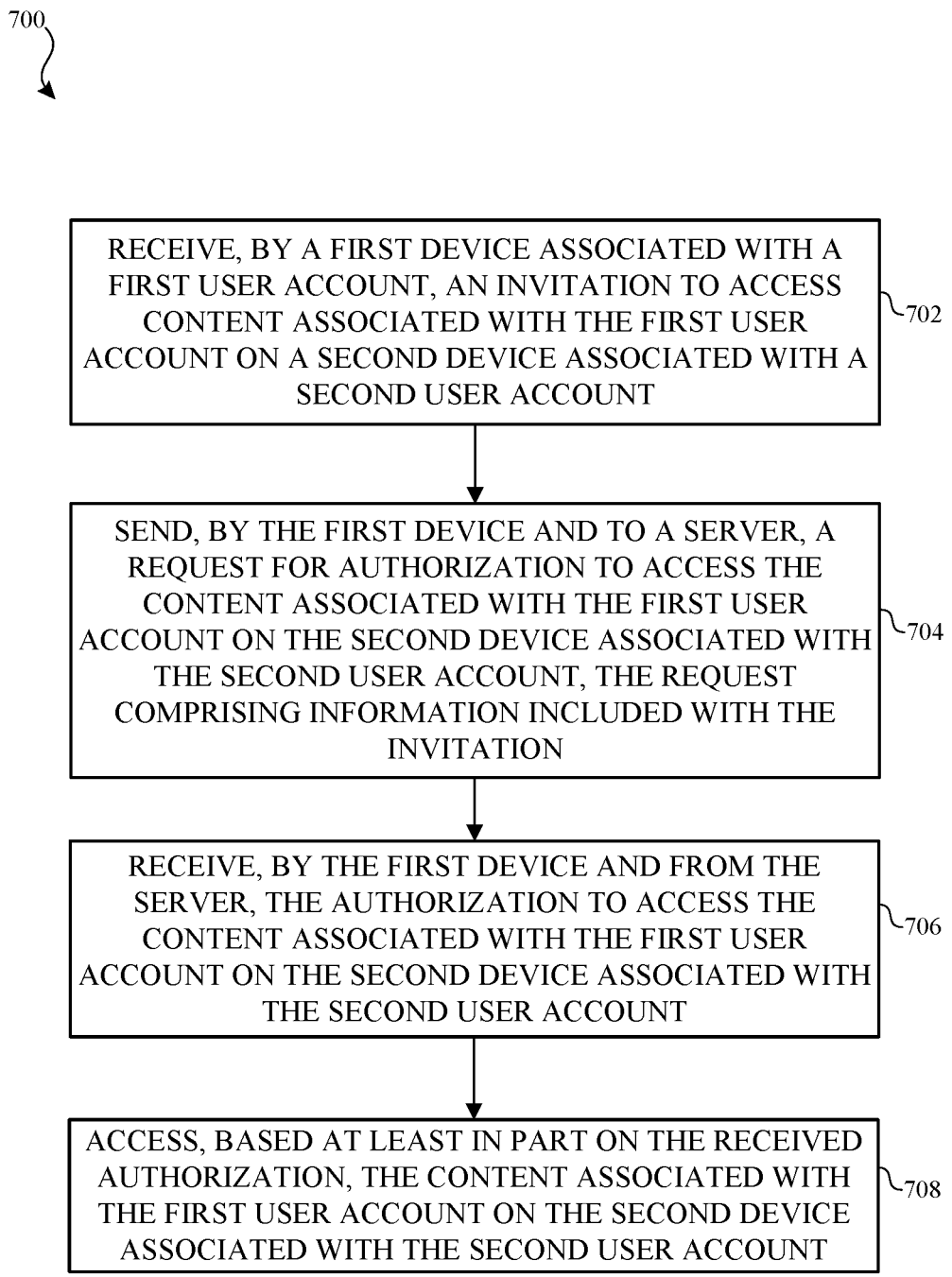
FIG. 7 illustrates a flow diagram of an example process for authorizing a user account to access content on a device in accordance with one or more implementations.

FIG. 7 illustrates a flow diagram of an example process for authorizing a user account to access content on a device in accordance with one or more implementations. For explanatory purposes, the process 700 is primarily described herein with reference to the electronic devices 102, 106, 108 and 110, the media content server 114 and the identity management server 116 of FIG. 1. However, the process 700 is not limited to the electronic devices 102, 106, 108 and 110, the media content server 114 and the identity management server 116 of FIG. 1, and one or more blocks (or operations) of the process 700 may be performed by one or more other components and/or other suitable devices. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The electronic device 102, which is associated with a first user account, receives an invitation to access content associated with the first user account on the electronic device 110, which is associated with a second user account (702).

The electronic device 102 sends, to the identity management server 116, a request for authorization to access the content associated with the first user account on the electronic device 110 associated with the second user account, the request including information included with the invitation (704).

The invitation may include a first ID associated with the first user account and a second ID associated with the second user account, and the sending may include sending the first ID and the second ID as part of the request for authorization. The invitation may further include a third ID associated with a home account (corresponding to the second user), and the sending may further include sending the third ID as part of the request for authorization.

The electronic device 102 receives, from the identity management server 116, the authorization to access the content associated with the first user account on the electronic device 110 associated with the second user account (706). The authorization to access the content may be limited to when the electronic device 102 is connected to a same local area network as the electronic device 110. The authorization may include a token which includes the first ID and the second ID.

The electronic device 110 may be associated with the home account (corresponding to the second user), and the authorization may provide for further access to the content associated with the first user account on one or more third devices associated with the home account.

Based at least in part on the received authorization, the content associated with the first user account is accessed on the electronic device 110 associated with the second user account (708). The electronic device 110 may receive an indication of the authorization, and may provide the indication of the authorization to the media content server 114 which stores the content, the media content server 114 being configured to provide the content to the electronic device 110 based on the indication of the authorization. The first user account may be associated with a content library provided by the media content server 114.

The identity management server 116 may receive a request to revoke the authorization to access the content, and send an indication of the revocation to the media content server 114. The request to revoke may be received from a device associated with the first or second user account.

As described above, one aspect of the present technology is the gathering and use of data available from specific and legitimate sources for outputting media content. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for outputting media content. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of outputting media content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 8:
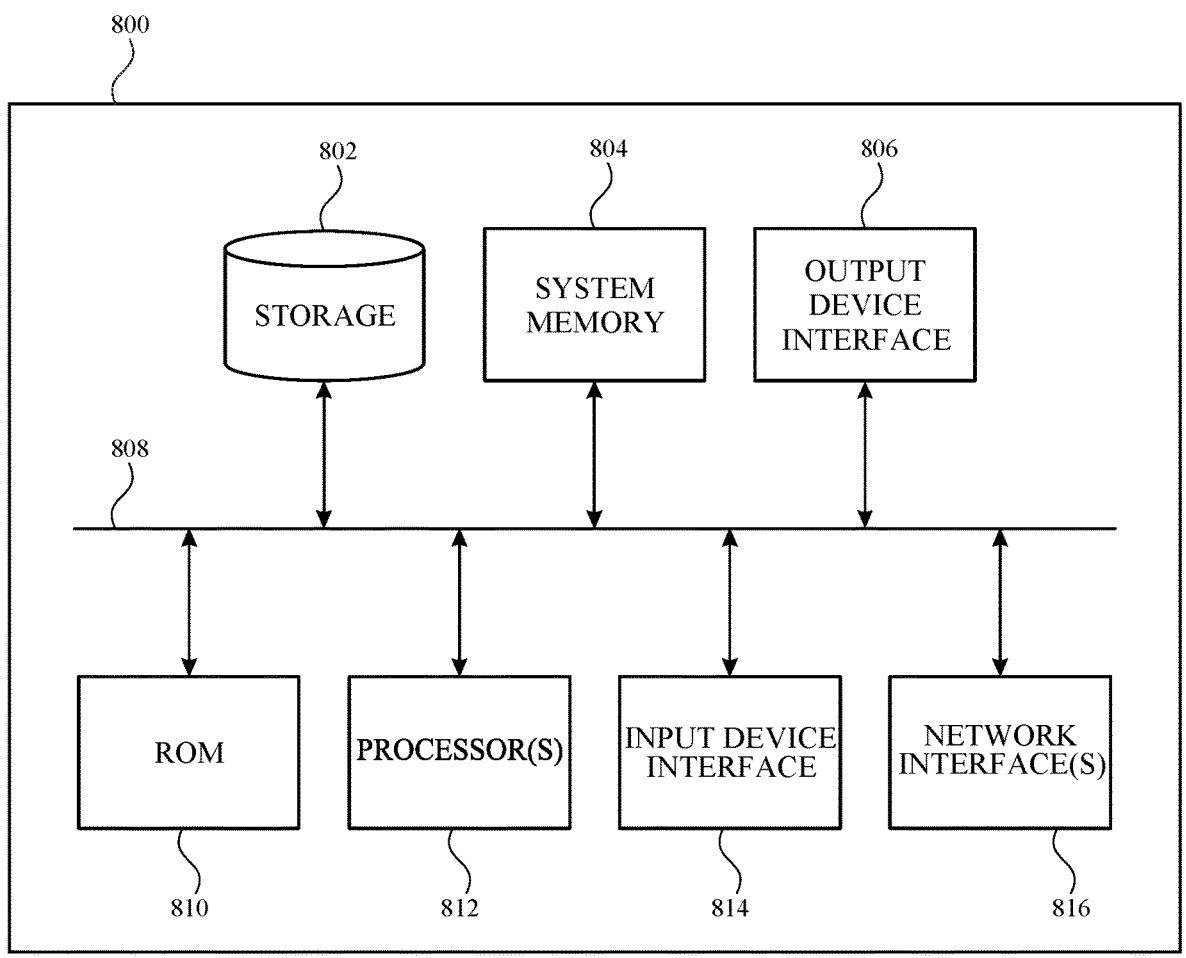
FIG. 8 illustrates an example electronic system with which aspects of the subject technology may be implemented in accordance with one or more implementations.

FIG. 8 illustrates an electronic system 800 with which one or more implementations of the subject technology may be implemented. The electronic system 800 can be, and/or can be a part of, one or more of the electronic devices 102-110, and/or one or the servers 114-118 shown in FIG. 1. The electronic system 800 may include various types of computer readable media and interfaces for various other types of computer readable media. The electronic system 800 includes a bus 808, one or more processing unit(s) 812, a system memory 804 (and/or buffer), a ROM 810, a permanent storage device 802, an input device interface 814, an output device interface 806, and one or more network interfaces 816, or subsets and variations thereof.

The bus 808 collectively represents all system, peripheral, and chipset buses that communicatively connect the numerous internal devices of the electronic system 800. In one or more implementations, the bus 808 communicatively connects the one or more processing unit(s) 812 with the ROM 810, the system memory 804, and the permanent storage device 802. From these various memory units, the one or more processing unit(s) 812 retrieves instructions to execute and data to process in order to execute the processes of the subject disclosure. The one or more processing unit(s) 812 can be a single processor or a multi-core processor in different implementations.

The ROM 810 stores static data and instructions that are needed by the one or more processing unit(s) 812 and other modules of the electronic system 800. The permanent storage device 802, on the other hand, may be a read-and-write memory device. The permanent storage device 802 may be a non-volatile memory unit that stores instructions and data even when the electronic system 800 is off. In one or more implementations, a mass-storage device (such as a magnetic or optical disk and its corresponding disk drive) may be used as the permanent storage device 802.

In one or more implementations, a removable storage device (such as a floppy disk, flash drive, and its corresponding disk drive) may be used as the permanent storage device 802. Like the permanent storage device 802, the system memory 804 may be a read-and-write memory device. However, unlike the permanent storage device 802, the system memory 804 may be a volatile read-and-write memory, such as random access memory. The system memory 804 may store any of the instructions and data that one or more processing unit(s) 812 may need at runtime. In one or more implementations, the processes of the subject disclosure are stored in the system memory 804, the permanent storage device 802, and/or the ROM 810. From these various memory units, the one or more processing unit(s) 812 retrieves instructions to execute and data to process in order to execute the processes of one or more implementations.

The bus 808 also connects to the input and output device interfaces 814 and 806. The input device interface 814 enables a user to communicate information and select commands to the electronic system 800. Input devices that may be used with the input device interface 814 may include, for example, alphanumeric keyboards and pointing devices (also called "cursor control devices"). The output device interface 806 may enable, for example, the display of images generated by electronic system 800. Output devices that may be used with the output device interface 806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 8, the bus 808 also couples the electronic system 800 to one or more networks and/or to one or more network nodes, such as one or more of the servers 114-118 shown in FIG. 1, through the one or more network interface(s) 816. In this manner, the electronic system 800 can be a part of a network of computers (such as a LAN, a wide area network ("WAN"), or an Intranet, or a network of networks, such as the Internet. Any or all components of the electronic system 800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by a first device associated with a first user account, an invitation to access content associated with the first user account on a second device associated with a home account corresponding to a second user account, wherein the invitation comprises a first identifier (ID) associated with the first user account and a second identifier (ID) associated with the second user account;
   sending, by the first device and to a server, a request for authorization to access the content associated with the first user account on the second device associated with the second user account, the request comprising the first ID and the second ID of the invitation;
   receiving, by the first device and from the server, the authorization to access the content associated with the first user account on the second device associated with the second user account, wherein the authorization comprises a token which includes the first ID and the second ID and the authorization provides for further access to the content associated with the first user account on one or more third devices associated with the home account when the home account is associated with the one or more third devices; and
   accessing, based at least in part on the received authorization, the content associated with the first user account on the second device associated with the second user account.

2. The method of claim 1, wherein the authorization to access the content is limited to when the first device is connected to a same local area network as the second device.

3. The method of claim 1, wherein the invitation further comprises a third ID associated with a home account, and wherein the sending further comprises sending the third ID as part of the request for authorization.

4. The method of claim 1, further comprising:
   receiving, by the second device, an indication of the authorization; and
   providing, by the second device, the indication of the authorization to a second server which stores the content, the second server being configured to provide the content to the second device based on the indication of the authorization.

5. The method of claim 4, further comprising:
   receiving, by the server, a request to revoke the authorization to access the content; and
   sending an indication of the revocation to the second server.

6. The method of claim 5, wherein the request to revoke is received from a device associated with the first or second user account.

7. The method of claim 4, wherein the first user account is associated with a content library provided by the second server.

8. A device, comprising:
at least one processor; and
a memory including instructions that, when executed by the at least one processor, cause the at least one processor to:
receive an invitation to access content associated with a first user account on another device associated with a home account corresponding to a second user account, wherein the invitation comprises a first identifier (ID) associated with the first user account and a second identifier (ID) associated with the second user account;
send, to a server, a request for authorization to access the content associated with the first user account on the other device associated with the second user account, the request comprising the first ID and the second ID of the invitation;
receive, from the server, the authorization to access the content, wherein the authorization comprises a token which includes the first ID and the second ID and the authorization provides for further access to the content associated with the first user account on one or more third devices associated with the home account when the home account is associated with the one or more third devices; and
access, based at least in part on the authorization, the content associated with the first user account on the other device associated with the second user account.

9. The device of claim 8, wherein the invitation further comprises a third ID associated with a home account, and wherein the sending further comprises sending the third ID as part of the request for authorization.

10. The device of claim 8, wherein the other device is configured to:
receive an indication of the authorization; and
provide the indication of the authorization to a second server which stores the content, the second server being configured to provide the content to the other device based on the indication of the authorization.

11. The device of claim 10, wherein the server is configured to:
receive a request to revoke the authorization to access the content; and
send an indication of the revocation to the second server.

12. The device of claim 11, wherein the request to revoke is received from a device associated with the first user account or the second user account.

13. The device of claim 10, wherein the first user account is associated with a content library provided by the second server.

14. A computer program product comprising code, stored in a non-transitory computer-readable storage medium, the code comprising:
code to receive, by a first device associated with a first user account, an invitation to access content associated with the first user account on a second device associated with a home account corresponding to a second user account, wherein the invitation comprises a first identifier associated with the first user account and a second identifier associated with the second user account;
code to send, by the first device and to a server, a request for authorization to access the content associated with the first user account to the second device associated with the second user account, the request comprising the first ID and the second ID of the invitation;
code to receive, by the first device and from the server, the authorization to access the content associated with the first user account on the second device associated with the second user account, wherein the authorization comprises a token which includes the first ID and the second ID and the authorization provides for further access to the content associated with the first user account on one or more third devices associated with the home account when the home account is associated with the one or more third devices; and
code to access, based at least in part on the received authorization, the content associated with the first user account on the second device associated with the second user account.

15. The computer program product of claim 14, wherein the token is provided to a content server, and the content associated with the first user account is provided to the second device associated with the second user account by the content server based at least in part on the token.

16. The computer program product of claim 14, wherein the other device is configured to:
receive an indication of the authorization; and
provide the indication of the authorization to a second server which stores the content, the second server being configured to provide the content to the second device based on the indication of the authorization.

17. The computer program product of claim 16, wherein the server is configured to:
receive a request to revoke the authorization to access the content; and
send an indication of the revocation to the second server.

18. The computer program product of claim 17, wherein the request to revoke is received from a device associated with the first user account or the second user account.

19. The computer program product of claim 16, wherein the first user account is associated with a content library provided by the second server.

20. The computer program product of claim 14, wherein the authorization to access the content is limited to when the first device is connected to a same local area network as the second device.

* * * * *

UNITED STATES PATENT AND TRADEMARK OFFICE
CERTIFICATE OF CORRECTION

| | | |
|---|---|---|
| PATENT NO. | : 11,893,585 B2 | Page 1 of 1 |
| APPLICATION NO. | : 16/712895 | |
| DATED | : February 6, 2024 | |
| INVENTOR(S) | : Peter J. Hare et al. | |

It is certified that error appears in the above-identified patent and that said Letters Patent is hereby corrected as shown below:

On the Title Page

In Column 2, item (56) under Other Publications, Line 1: "International Scarch Report" should read --International Search Report--

Signed and Sealed this
Sixteenth Day of April, 2024

Katherine Kelly Vidal
*Director of the United States Patent and Trademark Office*